United States Patent
Yoshikawa et al.

(10) Patent No.: US 8,350,439 B2
(45) Date of Patent: Jan. 8, 2013

(54) BRUSHLESS DC MOTOR OF OUTER ROTOR TYPE AND ELECTRONIC DEVICE USING THE SAME

(75) Inventors: Yuichi Yoshikawa, Osaka (JP); Hiroshi Murakami, Osaka (JP); Atsuyoshi Koshiba, Tottori (JP); Koji Kadowaki, Tottori (JP); Haruki Kato, Tottori (JP); Yasuo Kunishige, Tottori (JP)

(73) Assignee: Panasonic Corporation, Osaka (JP)

( * ) Notice: Subject to any disclaimer, the term of this patent is extended or adjusted under 35 U.S.C. 154(b) by 392 days.

(21) Appl. No.: 12/681,962

(22) PCT Filed: Oct. 8, 2008

(86) PCT No.: PCT/JP2008/002836
§ 371 (c)(1),
(2), (4) Date: Apr. 7, 2010

(87) PCT Pub. No.: WO2009/047895
PCT Pub. Date: Apr. 16, 2009

(65) Prior Publication Data
US 2010/0237752 A1    Sep. 23, 2010

(30) Foreign Application Priority Data
Oct. 9, 2007    (JP) ................... 2007-263097

(51) Int. Cl.
*H02K 1/14* (2006.01)
*H02K 1/12* (2006.01)
*H02K 1/16* (2006.01)
(52) U.S. Cl. ............... 310/216.092; 310/68 B; 310/193
(58) Field of Classification Search .............. 310/68 B, 310/67 R, 216.004, 216.016, 216.064, 216.043, 310/216.092, 193, 254.1; *H02K 1/06, 1/12, H02K 1/14, 1/16*
See application file for complete search history.

(56) References Cited

U.S. PATENT DOCUMENTS

| | | | | |
|---|---|---|---|---|
| 5,408,153 | A | * | 4/1995 | Imai et al. .................. 310/68 B |
| 5,604,389 | A | | 2/1997 | Nitta et al. |
| 5,652,470 | A | * | 7/1997 | von der Heide et al. .... 310/67 R |

(Continued)

FOREIGN PATENT DOCUMENTS

| | | |
|---|---|---|
| JP | 53-125002 A | 10/1978 |
| JP | 63-179752 A | 11/1988 |
| JP | 06-296353 A | 10/1994 |
| JP | 09-285044 A | 10/1997 |

(Continued)

OTHER PUBLICATIONS

International Search Report for International Application No. PCT/JP2008/002836, dated Jan. 13, 2009, 2 pages.

*Primary Examiner* — Quyen Leung
*Assistant Examiner* — Michael Andrews
(74) *Attorney, Agent, or Firm* — Brinks Hofer Gilson & Lione

(57) ABSTRACT

This motor includes a stator whereupon a plurality of magnetic poles are arranged at first prescribed intervals on the outer circumference section, and a rotor which is rotatively arranged on the outer circumference of the stator by having a prescribed space in between and has permanent magnets magnetized to different polarities at second prescribed intervals. The magnetic pole of the stator forms an extending section which extends from a magnetic pole base section in a direction parallel to the permanent magnet, and the extending length of the extending section in the direction parallel to the permanent magnet is same as that of the magnetic pole base section in the direction parallel to the permanent magnet or shorter.

9 Claims, 3 Drawing Sheets

U.S. PATENT DOCUMENTS

| | | | |
|---|---|---|---|
| 6,320,288 B1 * | 11/2001 | Suzuki et al. | 310/68 B |
| 2003/0102731 A1 * | 6/2003 | Shibata et al. | 310/67 R |
| 2006/0197402 A1 * | 9/2006 | Gomyo et al. | 310/216 |
| 2008/0106167 A1 * | 5/2008 | Gomyo et al. | 310/216 |

FOREIGN PATENT DOCUMENTS

| | | |
|---|---|---|
| JP | 2002-250888 A | 9/2002 |
| JP | 2007-244004 A | 9/2007 |

* cited by examiner

BRUSHLESS DC MOTOR OF OUTER ROTOR TYPE AND ELECTRONIC DEVICE USING THE SAME

TECHNICAL FIELD

This application is a U.S. national phase application of PCT/JP2008/002836 filed on Oct. 8, 2008, which claims priority to JP2007-263097 filed on Oct. 9, 2007, the contents of which are incorporated herein by reference.

The present invention relates to a motor, and an electronic device using the same, and more particularly to a structure of a stator of the motor.

BACKGROUND ART

In an electronic device, for example, in a laser printer, a paper feed roller (an element to be driven) provided in a main body case is coupled to a motor, and the paper feed roller is driven and rotated by the motor, and the paper is sent to a specified position.

This motor is generally a brushless DC motor. The motor includes a stator having a plurality of magnetic poles disposed on its circumference at first prescribed interval, and a rotor disposed on the circumference of this stator. On the inner circumference of the rotor, permanent magnets magnetized to different polarities are disposed at second prescribed intervals.

The magnetic pole of the stator forms an extending section which extends from a magnetic pole base section in a direction nearly parallel to the permanent magnet, and thereby the driving efficiency is enhanced.

That is, the width of the permanent magnet (in a direction orthogonal to the circumferential direction) is greater than the width in the same direction as that of the magnetic pole base section of the stator so as to be closer, as much as possible, to a magnetism detecting element for detecting the rotation of the rotor magnetically. Hence, the extending section is formed by extending from the magnetic pole base section of the stator in a direction nearly parallel to the permanent magnet. As a result, an opposite surface area of the magnetic pole and the permanent magnet of the stator is increased, and the driving force and the driving efficiency are increased. A similar technology is disclosed, for example, in patent document 1.

As mentioned above, in the conventional motor having the extending section formed and extended from the magnetic pole base section of the magnetic pole of the stator nearly in a direction parallel to the permanent magnet, the opposite surface area of the permanent magnet of the rotor and the magnetic pole of the stator is increased. As a result, it was generally believed that the driving force is larger and that the driving efficiency is higher.

However, according to the investigation by the present inventor, only by forming the extending section, the driving force was not always increased.

That is, following a general concept, increasing of the opposite surface area of the permanent magnet of the rotor and the magnetic pole of the stator leads to heightening of the driving force, and the extending section from the electrode of the stator should be as long as possible. However, if the extending section is increased too much, an amount of a magnetic flux from an opposite permanent magnet is increased proportionally. It leads to an occurrence of a magnetic saturation of a magnetic circuit connected to the magnetic pole of the stator. As a result, the driving force and the driving efficiency cannot be enhanced.

Patent document 1: Japanese Patent Application Unexamined Publication No. 9-285044

SUMMARY OF THE INVENTION

A motor of the present invention is provided with a stator whereupon a plurality of magnetic poles are arranged at first prescribed intervals on the outer circumference section, and a rotor which is rotatively arranged on the outer circumference of the stator by having a prescribed space in between and has permanent magnets magnetized to different polarities at second prescribed intervals. The magnetic pole of the stator forms an extending section which extends from a magnetic pole base section in a direction parallel to the permanent magnet, and the extending length of the extending section in the direction parallel to the permanent magnet is same as that of the magnetic pole base section in the direction parallel to the permanent magnet or shorter.

In this configuration, in the motor of the present invention, magnetic saturation does not occur in the magnetic circuit connected to the magnetic pole, and the driving efficiency is enhanced, so that a high efficiency and a low power consumption can be realized.

Further, the present invention provides an electronic device having a main body case, an element to be driven provided in the main body case, and the same motor coupled to this element to be driven by way of a coupling mechanism.

PREFERRED EMBODIMENTS FOR CARRYING OUT THE INVENTION

Preferred embodiments of the present invention are described below while referring to the accompanying drawings.

Preferred Embodiment 1

Figure 1:
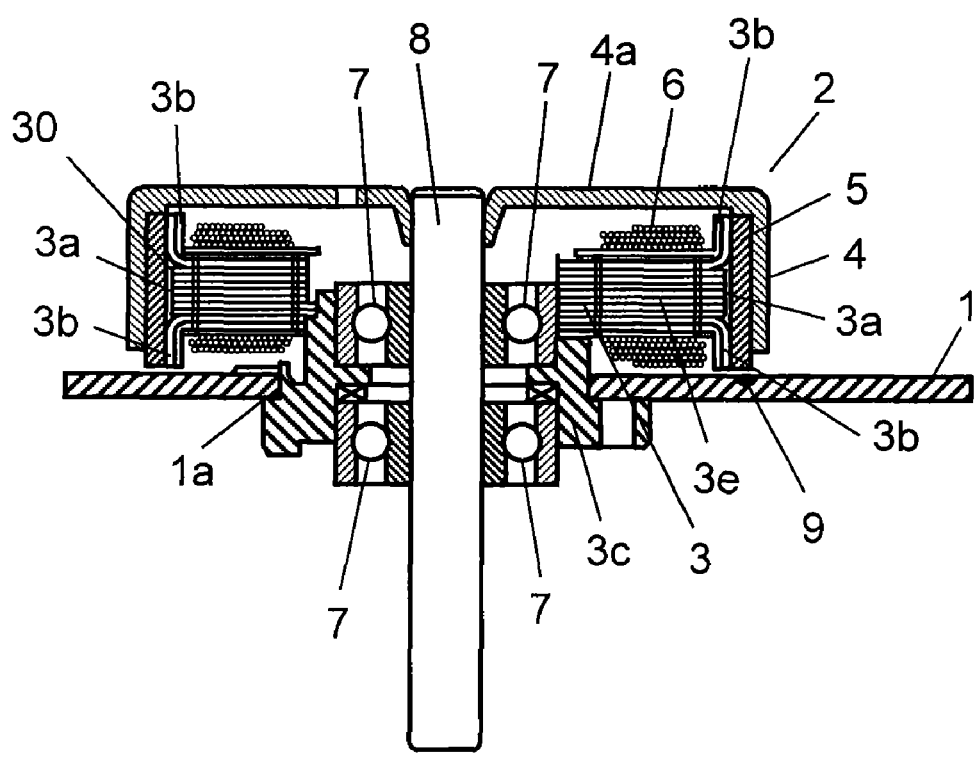
FIG. 1 is a sectional view of a motor in preferred embodiment 1 of the present invention.
Figure 2:
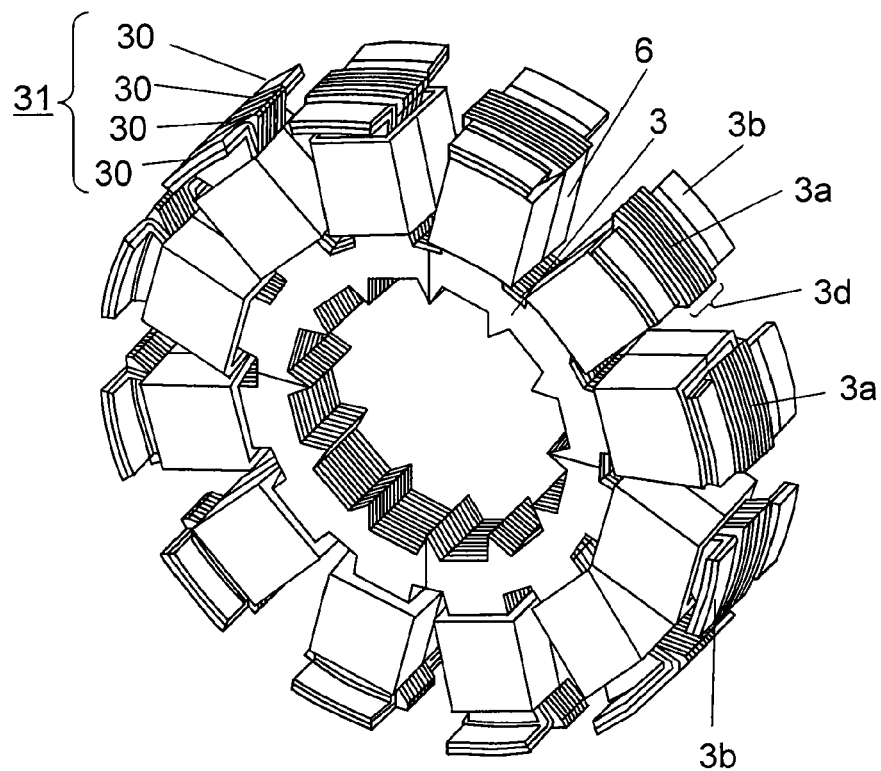
FIG. 2 is a perspective view of a stator of the motor in preferred embodiment 1 of the present invention.
Figure 3:
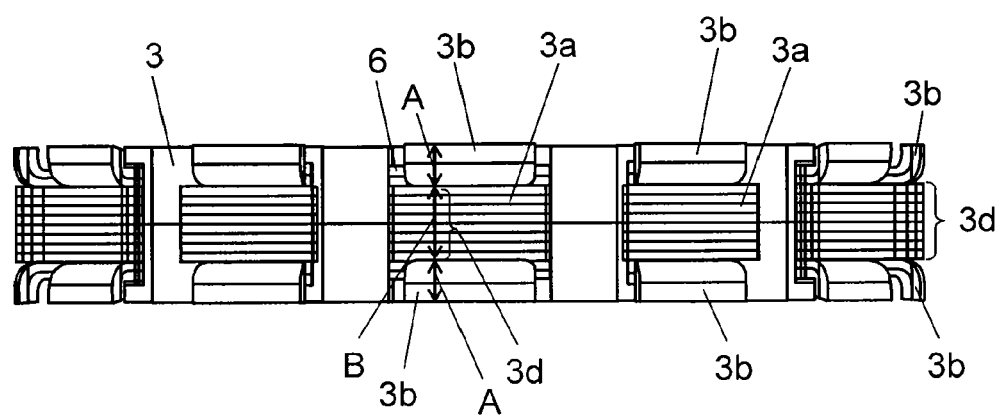
FIG. 3 is a front view of the stator of the motor in preferred embodiment 1 of the present invention.

FIG. 1 is a sectional view of a motor in preferred embodiment 1 of the present invention, FIG. 2 is a perspective view of a stator of the motor, and FIG. 3 is a front view of the stator. Motor 2 is a brushless DC motor of so-called outer rotor type.

In FIG. 1, motor 2 is disposed on wiring board 1 of an electronic device (for example, a laser printer) in a horizontal direction. Further, motor 2 forms laminated body 31 (stator core) by laminating plate bodies 30 (for example, silicon steel plates) as shown in FIG. 1 and FIG. 2. Motor 2 is provided with stator 3 including this laminated body 31, and rotor 4 opposite to stator 3 across a specified gap, and disposed rotatively on the outer circumference of stator 3. Rotor 4 has a cylindrical form opened at the lower side.

Upon the outer circumference section of stator 3, a plurality of magnetic poles 3*a* are arranged at first prescribed intervals. In the portion of magnetic circuit 3*e* inside of each magnetic pole 3*a*, coil 6 is wound as shown in FIG. 1 and FIG. 2. On the inner circumference of rotor 4, ring-shaped permanent magnets 5 magnetized alternately to different polarities, N poles and S poles (adjacent poles being different poles), are fixed at second prescribed intervals by means of an adhesive or the like.

That is, by applying an alternating-current power to coil 6, magnetic poles 3a are alternately magnetized in N poles and S poles, and an attracting force and a repulsing force are generated against permanent magnets 5 existing on the outer circumference. This alternating force is the rotating and driving force of rotor 4.

Stator 3 is fixed on wiring board 1 by way of holding section 3c. A plurality of bearings 7 are provided on the inner circumference of this stator 3. To penetrate this group of bearings 7 in a vertical direction, drive shaft 8 is provided. An upper end of this drive shaft 8 is fixed to top plate 4a of rotor 4.

Therefore, by applying an alternating-current power to this coil 8, when magnetic poles 3a are alternately magnetized to N poles and S poles, an attracting force and a repulsing force are generated against permanent magnets 5, and hence rotor 4 rotates about this drive shaft 8. This rotating force is transmitted to the element to be driven by way of drive shaft 8.

In the portion corresponding to the lower end of permanent magnet 5 on wiring board 1, Hall IC 9 is mounted as a magnetism detecting element. As known well, by this Hall IC 9, the rotating position of rotor 4 is detected, and also the rotating speed and the amount of rotation are detected, so that the number of revolutions is controlled.

To position permanent magnet 5 as closely to Hall IC 9 as possible, its lower end is extended nearly to Hall IC 9. Further, to avoid imbalance to stator 3 when the lower end of permanent magnet 5 is extended downward, the upper end of this permanent magnet 5 is also extended upward by a same extent.

In conclusion, permanent magnet 5 is increased in dimension in the vertical direction, and in the present preferred embodiment, to conform to this size, as shown in FIG. 1 to FIG. 3, each magnetic pole 3a of stator 3 has extending section 3b formed integrally, by extending from its magnetic pole base section 3d, in upper and lower directions in a direction nearly parallel to permanent magnet 5. That is, extending section 3b extends in a longitudinal direction of drive shaft 8 from upper and lower sides of magnetic pole base section 3b so as to be opposite substantially in parallel to permanent magnet 5.

More specifically, extending section 3b is formed by bending the outer circumference section of two plate bodies 30 including upper and lower sides (outermost layers) of the plurality of plate bodies 30 laminated to compose laminated body 31 of stator 3, nearly at right angle in upper and lower directions in a direction nearly parallel to permanent magnet 5.

Thus, of the plurality of plate bodies 30 laminated to compose stator 3, the outer circumference sections of upper and lower sides (two plates each including the outermost circumference layer) of plate bodies 30 are bent nearly at right angle in the upper and lower directions in a direction nearly parallel to permanent magnet 5, and thereby extending section 3b is formed. As a result, the opposite surface area with permanent magnet 5 extended in the upper and lower directions is increased as shown in FIG. 1. Hence, a large driving force is obtained in rotor 4.

However, the extending length (A+A in FIG. 3) of extending section 3b extending in the upper and lower directions in a direction nearly parallel to permanent magnet 5 is not more than the length (B in FIG. 3) of magnetic pole base section 3d in a direction nearly parallel to permanent magnet 5.

In other words, when the extending length (A+A) of extending section 3b extending in the upper and lower directions in a direction nearly parallel to permanent magnet 5 is increased, the amount of a magnetic flux invading from permanent magnet 5 is larger. As a result, a magnetic saturation may occur in the portion of magnetic circuit 3e on which coil 6 for electro-magnet at the inside of each magnetic pole 3a is wound.

If such magnetic saturation occurs, if the electric power to be applied to coil 6 is increased, the rotating torque of rotor 4 cannot be increased proportionally, and the driving efficiency is lowered.

As a result of various studies, in the present preferred embodiment, as mentioned above, the extending length (A+A) of extending section 3b extending in the upper and lower directions in a direction nearly parallel to permanent magnet 5 is same as or shorter than the length (B) of magnetic pole base section 3d in a direction nearly parallel to permanent magnet 5. As a result, no magnetic saturation occurs in the portion of magnetic circuit 3e on which coil 6 at the inside of each magnetic pole 3a is wound, and the driving efficiency is increased.

In the present preferred embodiment, during use for a long period, due to some stress (for example, a centrifugal force in rotation), this extending section 3b may be deformed to the side of permanent magnet 5, and may contact when rotor 4 rotates. In such a case, the bending leading end side of extending section 3b is increased in the bending amount so as to be position at the inner side of stator 3 as compared with the bending root portion. That is, since a gap between the inside of permanent magnet 5 of rotor 4 and magnetic pole 3a of stator 3 is very small, for example, about 0.3 mm, and contacting thereof may be feared. In such a case, the gap at the bending leading end side of extending section 3b is increased more than the bending root portion.

As explained above, extending section 3b is formed by bending the upper and lower sides (the outermost circumference layers) of plate bodies 30, out of plate bodies 30 laminated to compose laminated body 31 of stator 3, but it is not limited to a same material. For example, extending section 3b may be formed of a material different from plate bodies 30 laminated to compose laminated body 31.

The present invention, as described herein, includes an extending section, on the magnetic pole of the stator, which extends from its magnetic pole base section, in a direction nearly parallel to the permanent magnet. The extending length of the extending section in the direction nearly parallel to the permanent magnet is the same as or shorter than that of the magnetic pole base section in the direction nearly parallel to the permanent magnet. Accordingly, magnetic saturation is not caused in the magnetic circuit coupled to the magnetic pole due to a magnetic flux flowing in from this extending section, and the driving efficiency is enhanced, and high efficiency and low power consumption are realized.

Preferred Embodiment 2

Figure 4:
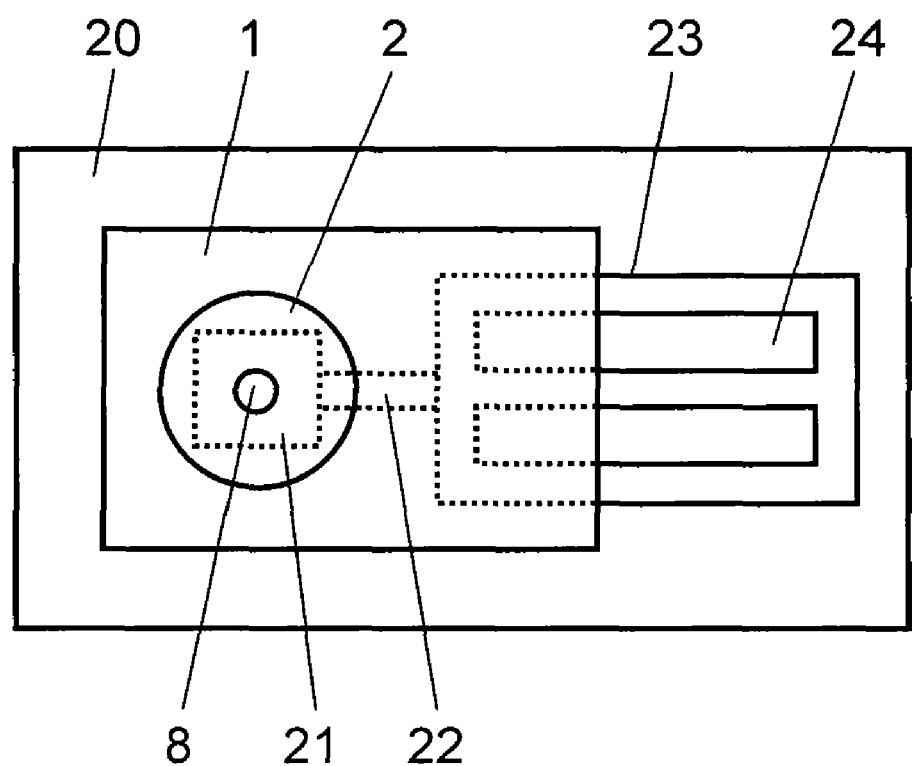
FIG. 4 is a schematic explanatory view of an electronic device in preferred embodiment 2 of the present invention.

FIG. 4 is a schematic explanatory view of an electronic device (for example, a laser printer) in preferred embodiment 2 of the present invention. In FIG. 4, motor 2 explained in preferred embodiment 1 is mounted on wiring board 1. On this wiring board 1, further, other electronic components (not shown) necessary for the electronic device are mounted together.

The lower end of drive shaft 8 of motor 2 is extended to the lower portion of wiring board 1 by penetrating through-hole 1a (shown in FIG. 1) of wiring board 1, and gear box 21 is coupled to the lower portion of this drive shaft 8. Rotation of motor 2 is reduced in speed by this gear box 21. The rotating and driving force of motor 2 is further transmitted to element to be driven 23 including a plurality of paper feed rollers 24 by way of coupling mechanism 22. In consequence, the plurality of paper feed rollers 24 are put in rotation, and the paper is fed.

According to the electronic device of the present preferred embodiment, the driving efficiency is enhanced, and high efficiency and low power consumption can be realized.

Industrial Applicability

As described herein, according to the motor of the present invention, the driving efficiency is enhanced, and high efficiency and low power consumption are realized, so that it may be applied widely in laser printers and other electronic devices.

The invention claimed is:

1. A motor comprising:
a stator whereupon a plurality of magnetic poles are arranged at first prescribed intervals on the outer circumference section; and
a rotor which is rotatively arranged with a gap adjacent the outer circumference of the stator, wherein the rotor has permanent magnets magnetized to different polarities at second prescribed intervals,
wherein the magnetic pole of the stator forms an extending section which extends from a magnetic pole base section in a direction parallel to the permanent magnet, wherein the gap in the extending section is larger at an end side of the extending section as compared with the gap from the magnetic pole base section.

2. The motor of claim 1, wherein the extending section of the magnetic pole is provided at each one of both sides of the magnetic pole base section, and a combined length of both sides of the extending section in the direction parallel to the permanent magnet is equal to or less than a length of the magnetic pole base section in the direction parallel to the permanent magnet.

3. The motor of claim 2, wherein the stator has a laminated body formed by laminating plate bodies, and the extending section is formed by bending the plate body of at least the outermost layer of the laminated body in a direction parallel to the permanent magnet.

4. The motor of claim 2, wherein the stator has a laminated body formed by laminating plate bodies, and the extending section is formed by bending the plurality of plate bodies including at least the outermost layer of the laminated body in a direction parallel to the permanent magnet.

5. The motor of claim 1, wherein the stator has a laminated body formed by laminating plate bodies, and the extending section is formed by bending the plate body of at least the outermost layer of the laminated body in a direction parallel to the permanent magnet.

6. The motor of claim 1, wherein the stator has a laminated body formed by laminating plate bodies, and the extending section is formed by bending the plurality of plate bodies including at least the outermost layer of the laminated body in a direction parallel to the permanent magnet.

7. An electronic device comprising a main body case, a driven body provided in the main body case, and a motor coupled to the driven body by way of a coupling mechanism, the motor comprising:
a stator whereupon a plurality of magnetic poles are arranged at first prescribed intervals on the outer circumference section; and
a rotor which is rotatively arranged on with a gap adjacent to the outer circumference of the stator, wherein the rotor has permanent magnets magnetized to different polarities at second prescribed intervals,
wherein the magnetic pole of the stator forms an extending section which extends from a magnetic pole base section in a direction parallel to the permanent magnet, wherein the gap in the extending section is larger at a leading end side of the extending section as compared with a root side.

8. The electronic device of claim 7, wherein a wiring board is further provided in the main body case, and the motor is mounted on the wiring board, and the wiring board is provided with a magnetism detecting element formed in a portion corresponding to the permanent magnets.

9. The electronic device of claim 8, wherein the magnetism detecting element is a Hall IC.

* * * * *